US008069137B2

(12) United States Patent
Tischer

(10) Patent No.: US 8,069,137 B2
(45) Date of Patent: *Nov. 29, 2011

(54) METHODS, SYSTEMS, AND STORAGE MEDIUMS FOR IMPLEMENTING INTELLIGENT AGENT SERVICES

(75) Inventor: Steven Tischer, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 134 days.

This patent is subject to a terminal disclaimer.

(21) Appl. No.: 12/543,546

(22) Filed: Aug. 19, 2009

(65) Prior Publication Data
US 2009/0307259 A1 Dec. 10, 2009

Related U.S. Application Data

(63) Continuation of application No. 11/314,614, filed on Dec. 20, 2005, now Pat. No. 7,590,649.

(51) Int. Cl.
*G06F 17/30* (2006.01)
(52) U.S. Cl. .................................................. 707/600
(58) Field of Classification Search ................. None
See application file for complete search history.

(56) References Cited

U.S. PATENT DOCUMENTS

| 5,978,766 | A | 11/1999 | Luciw |
| 6,119,101 | A | 9/2000 | Peckover |
| 6,622,136 | B2 | 9/2003 | Russell |
| 7,181,438 | B1 | 2/2007 | Szabo |
| 7,225,183 | B2 | 5/2007 | Gardner |
| 7,293,271 | B2 | 11/2007 | Trossen et al. |
| 2002/0049763 | A1* | 4/2002 | Seamon .................. 707/100 |
| 2002/0194181 | A1* | 12/2002 | Wachtel .................. 707/10 |
| 2002/0194201 | A1 | 12/2002 | Wilbanks et al. |
| 2003/0069877 | A1 | 4/2003 | Grefenstette et al. |
| 2004/0107155 | A1 | 6/2004 | Yanosy |
| 2004/0201702 | A1* | 10/2004 | White .................. 348/207.99 |
| 2005/0197995 | A1 | 9/2005 | Badt, Jr. et al. |
| 2006/0123027 | A1 | 6/2006 | Kohlhammer et al. |
| 2006/0206883 | A1 | 9/2006 | Sabbouh |
| 2007/0043742 | A1 | 2/2007 | Arguello et al. |

(Continued)

OTHER PUBLICATIONS

Alexandros Moukas, Amalthaea: Information Discovery and Filtering Using a Multi-Agent Evolving Ecosystem, Proceedings of the Conference on the Practical Application of Intelligent Agents and MultiAgent Technology, London, UK, 1996.

(Continued)

*Primary Examiner* — Mohammad Ali
*Assistant Examiner* — Syed H Hasan
(74) *Attorney, Agent, or Firm* — Cantor Colburn LLP

(57) ABSTRACT

Methods, systems, and storage mediums for implementing intelligent agent services are provided. A method includes generating an ontological domain for an individual based upon information elements. A set of information elements represents a behavior of the individual at a point in time. Generating the ontological domain includes creating subdomains of contextually organized collections of sets of information elements, where the subdomains include any orthogonally related data identified among behaviors. The method also includes determining relevance of relationships among the information elements in the ontological domain. The relevance is determined based upon measurable aspects, whereby a relationship determined to be relevant is identified as an interest of the individual. The method also includes identifying sources of information topically related to the interest, and searching the sources of information using the information elements determined to be relevant to identify a solution for satisfying the interest.

17 Claims, 8 Drawing Sheets

U.S. PATENT DOCUMENTS

2007/0143243 A1 6/2007 Tischer
2008/0040377 A1 2/2008 Ribiere et al.
2008/0077598 A1 3/2008 Wilmering et al.
2008/0091633 A1 4/2008 Rappaport et al.

OTHER PUBLICATIONS

Sieg, Ahu, Bamshad Mobasher, Robin Burke, Inferring User's Information Context: Integrating User Profiles and Concept Hierarchies, Proceedings of the 2004 Meeting of the International Federation of Classification Societies, 2004.

Yu, Shijun, Lina Al-Jadir, Stephano Spaccapietra, Matching User's Semantics With Data Semantics in Location-Based Services, 1st Workshop on Semantics in Mobile Environments, May 2005.

Chen, Liren and Katia Sycara, WebMate: A Personal Agent for Browsing and Searching, Proceedings of the 2nd International Conference on Autonomous Agents, 1998, pp. 132-139.

* cited by examiner

INFORMATION ELEMENTS RECORD

RECORD_IDENTIFIER

DATE

TIME

LOCATION
    LOCATION_NAME
    LOCATION_ADRESS

BEHAVIOR1
    BEHAVIOR_ACTION
    BEHAVIOR_SUBJECT
BEHAVIOR2
    BEHAVIOR_ACTION
    BEHAVIOR_SUBJECT
...
OTHER

VALUE
    COST
    DURATION
    SAVINGS

| REC | DATE | TIME | LOC_NM | LOC_ADDR | BEHAVIOR1_ACT | BEHAVIOR1_SUBJ | OTHER | VALUE |
|---|---|---|---|---|---|---|---|---|
| 402A | 402B | 402C | 402D | 402E | 402F | 402G | 402H | 402I |
| 1 | 12/1/2005 | 9:00:00 | ANNA'S MARKET | MAIN ST CITY | PURCHASE | BREAD | | $5.00 |
| 2 | 12/1/2005 | 9:30:00 | ALEX'S CAR SALES | MAIN ST CITY | PURCHASE | MERCEDES | MILEAGE | $100,000 |
| 3 | 12/1/2005 | 13:00:00 | ERIK'S PEKING HOUSE | PINE ST CITY | PURCHASE | DINNER | DUCK | $50.00 |
| 4 | 12/1/2005 | 18:00:00 | STEVE'S CULINARY SCHOOL | MAIN ST | PURCHASE | COOK CLASS | | $1,500 |
| 5 | 12/2/2005 | 8:30:00 | WWW.TRAVEL.COM | WEB | PURCHASE | RESERVATIONS | | $150.00 |
| 6 | 12/2/2005 | 10:00:00 | ABC HARDWARE | MAPLE ST CITY | PURCHASE | TOOLS | | $300 |
| 7 | 12/2/2005 | 11:00:00 | DRY CLEANERS | STATE ST | PURCHASE | DRY CLEAN SVC | | $50 |
| 8 | 12/2/2005 | 12:15:00 | WWW.HOME REPAIR.COM | WEB | SEARCH | DECK BUILDING | | 2'30" |
| 9 | 12/2/2005 | 15:00:00 | WWW.AMAZON.COM | WEB | PURCHASE | WOK | | $75.00 |
| 10 | 12/2/2005 | 15:30:00 | WWW.YELLOWPGS.COM | WEB | SEARCH | CONTRACTORS | | 30" |
| 11 | 12/2/2005 | 19:00:00 | WWW.BIRD WATCHERS.ORG | WEB | WEBLOG | CHAT | | 60" |
| 12 | 12/2/2005 | 23:00:00 | MARRIOTT | ST JAMES BOSTON | CHECKIN | | | $250.00 |
| . | . | . | | | . | | | |
| . | . | . | | | . | | | |
| . | . | . | | | . | | | |
| X1 | 12/8/2005 | 9:30:00 | ANNA'S MARKET | MAIN ST CITY | PURCHASE | BREAD | | $5.00 |
| X2 | 12/8/2005 | 10:00:00 | JOE'S CONVENIENCE | MAIN ST | PURCHASE | GAS | | $25.00 |
| . | . | . | | | | | | |
| . | . | . | | | | | | |
| Y1 | 3/1/2006 | 13:00:00 | TRAVEL CITY | 1800-123456 | PURCHASE | SKI PACKAGE | 3/27-3/30 | $800.00 |

600

VERMONT SKI TRIP

MARCH 27 THROUGH MARCH 30, 2005

MERCEDES SERVICED ON 12/1/05. NEXT SERVICING DUE IN MARCH.

AAA MEMBERSHIP EXPIRES ON 3/15/05.

*FIG. 6*

METHODS, SYSTEMS, AND STORAGE MEDIUMS FOR IMPLEMENTING INTELLIGENT AGENT SERVICES

CROSS-REFERENCE TO RELATED APPLICATIONS

This application is a continuation of U.S. patent application Ser. No. 11/314,614, filed Dec. 20, 2005, the entire contents of which are incorporated herein by reference.

BACKGROUND

The present invention relates generally to automated data collection and processing, and more particularly, to methods, systems, and storage mediums for implementing ontological domain and contextually intelligent agent services.

Information is ubiquitously created and exchanged using a variety of communications technologies and systems. Various techniques have been employed to capture and organize information in a way that facilitates quick and simple retrieval and subsequent utilization. Intelligent devices, or artificial intelligence devices, have been developed for attempting to codify specific information about a discipline, or domain, which can then be used for a variety of purposes.

In addition, collaborative filtering techniques have been used to aggregate similar information sets from multiple individuals and provide a summary opinion. Another technique has employed ontologically related systems for allowing domain experts to create ontologies that can be used for drawing inferences. However, these pre-defined domains do not reflect the personalized needs, interests, or preferences of people at an individual level. Nor do these domains dynamically change over time as the preferences or interests of an individual change.

What is needed, therefore, is a way to address the individual preferences, interests, and needs of individuals by automatically collecting individual-specific information and generating customized ontological domains for use in analysis and inferences. What is also needed is a way to identify and present specific solutions that address the needs, preferences, and interests of individuals.

BRIEF SUMMARY

Exemplary embodiments include methods for implementing intelligent agent services. A method includes generating an ontological domain for an individual based upon information elements. A set of information elements represents a behavior of the individual at a point in time. Generating the ontological domain includes creating subdomains of contextually organized collections of sets of information elements, where the subdomains include any orthogonally related data identified among behaviors. The method also includes determining relevance of relationships among the information elements in the ontological domain. The relevance is determined based upon measurable aspects, whereby a relationship determined to be relevant is identified as an interest of the individual. The method also includes identifying sources of information topically related to the interest, and searching the sources of information using the information elements determined to be relevant to identify a solution for satisfying the interest.

Additional embodiments include a system for implementing intelligent agent services. The system includes a host system computer and an application executing on the host system computer. The application performs a method that includes generating an ontological domain for an individual based upon information elements. A set of information elements represents a behavior of the individual at a point in time. Generating the ontological domain includes creating subdomains of contextually organized collections of sets of information elements, where the subdomains include any orthogonally related data identified among behaviors. The method also includes determining relevance of relationships among the information elements in the ontological domain. The relevance is determined based upon measurable aspects, whereby a relationship determined to be relevant is identified as an interest of the individual. The method also includes identifying sources of information topically related to the interest, and searching the sources of information using the information elements determined to be relevant to identify a solution for satisfying the interest.

Further embodiments include a computer-readable storage medium for implementing intelligent agent services. The computer-readable storage medium includes instructions embodied on a computer-readable medium for implementing a method. The method includes generating an ontological domain for an individual based upon information elements. A set of information elements represents a behavior of the individual at a point in time. Generating the ontological domain includes creating subdomains of contextually organized collections of sets of information elements, where the subdomains include any orthogonally related data identified among behaviors. The method also includes determining relevance of relationships among the information elements in the ontological domain. The relevance is determined based upon measurable aspects, whereby a relationship determined to be relevant is identified as an interest of the individual. The method also includes identifying sources of information topically related to the interest, and searching the sources of information using the information elements determined to be relevant to identify a solution for satisfying the interest.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES:

FIG. 3 is a data structure including sample data fields for storing information elements and creating records for use in implementing the ontological domain services in exemplary embodiments;

FIG. 4 is a database of records created using the data structure depicted in FIG. 3 in exemplary embodiments;

FIG. 6 is a sample notification that includes an interest resulting from implementation of the ontological domain services in exemplary embodiments;

The detailed description explains the exemplary embodiments, together with advantages and features, by way of example with reference to the drawings.

DETAILED DESCRIPTION

In accordance with exemplary embodiments, ontological domain and contextually intelligent agent services are provided. Information elements for detectable behaviors are gathered and an ontological domain is defined that reflects the information elements in terms of transactions, locations, queries, and other behavioral indicators that occur within a physical and/or virtual geography and in relation to time. The ontological domain may be considered to be a contextual organization of an information domain around a concept. Detectable behaviors may include any type of activity, presence, transaction, etc., that is capable of being detected by a human and/or machine.

The ontological domain is self-governing and may include one or more domain categories, or sub-domains that provide an information structure that enables orthogonally related elements among the sub-domains to be ascertained and utilized. An interest can be determined from analyzing the ontological domain. An interest may include any type of information that is determined to be of value or relevance to a particular individual. An interest may also include a need of the individual. An identified interest may be used by the contextually intelligent agent services to identify and search sources of information for addressing the interest. The intelligent agent services look for matches among information elements found within the information sources and information elements relating to the interest. Any matches are analyzed in order to determine a likely solution to the interest. The solution is then made available to the relevant individual or entity. The ontological domain services are described in FIGS. 1-6 and the intelligent agent services are described in FIGS. 1, 5, and 7-8.

Figure 1:
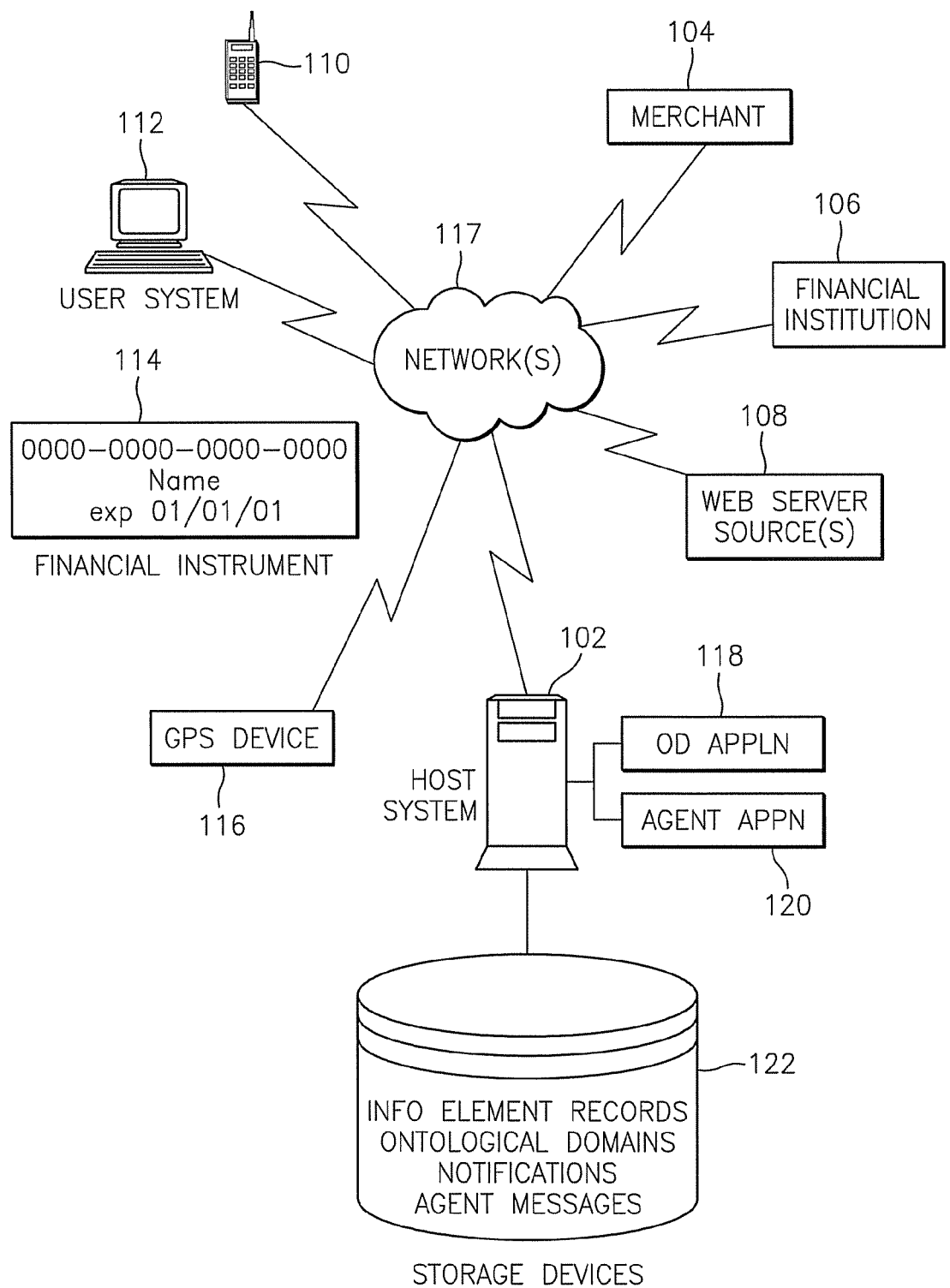
FIG. 1 depicts a system upon which the ontological domain and intelligent agent services may be implemented in exemplary embodiments.

Turning now to FIG. 1, a system upon which the ontological domain and intelligent agent services may be implemented in accordance with exemplary embodiments will now be described. The system of FIG. 1 includes a host system 102 in communication with devices 110, 112, and 116, as well as information sources 104, 106, and 108 via one or more networks 117. Host system 102 may be implemented by a service provider of the ontological domain and intelligent agent services described herein. For example, host system 102 may be operated by a network service provider that provides Internet, Web, cable television, telephone, or other similar type of services to customers, in addition to the ontological domain and intelligent agent services. Alternatively, host system 102 may be implemented by an application service provider (ASP) or other service enterprise.

In exemplary embodiments, information sources 104, 106, and 108 include a merchant 104, a financial institution 106, and a web server information source 108. Merchant 104 may be a 'brick and mortar' entity that provides products and/or services to customers at a geographic location (e.g., a local hardware store, a grocery market, a gas station, a retail chain establishment, etc.). Additionally, or alternatively, merchant 104 may be a 'virtual' establishment that provides goods and/or services over a network via, e.g., a website.

Financial institution 106 refers to a bank, credit union, or other entity that provides financial services (e.g., checking/savings accounts, loans, mortgages, investments, credit services, etc.) to customers. Financial institution 106 may be a 'brick and mortar' facility and/or a virtual establishment, similar to the merchant 104 described above.

In exemplary embodiments, Web server source 108 refers to a network entity that provides information (e.g., in response to requests, queries, searches, etc.) to requesting individuals. Web server source 108 includes server software executing on a processor and a data store with network connectivity and may provide access to information in its data store via a web site or portal to individuals. An example of an information source implemented by Web server source 108 is a Web Log or BLOG established for users in a BLOG community or a personal website maintained and operated by an individual. Alternatively, web server source 108 may include websites that provide information such as link directories, white papers, reference libraries, etc.

The information sources described above are provided for illustrative purposes. It will be appreciated that any number and type of information sources that provide electronic information, products, and/or services may be utilized in implementing the exemplary embodiments described herein.

In exemplary embodiments, a mobile communications device 110, a user system 112, a financial instrument 114, and a global positioning system (GPS) device 116 are also included in the system of FIG. 1. Each of these items 112-116 may be under the control of an individual or entity (e.g., a business). Mobile communications device 110 may be a cellular telephone, personal digital assistant (PDA), pager, laptop, or a hybrid device that utilizes various communications technologies (e.g., digital wireless and over-the-air) technologies.

The user system 112 refers to a personal computer or desktop device, that is network-enabled via, e.g., digital subscriber line (DSL), dial-up, or other similar type of networking systems and services. User system 112 may execute applications, such as a web browser, word processing tool, messaging application, etc.

Financial instrument 114 may be a credit card, bank or automated teller machine (ATM) card, retailer credit card, check, or other similar type of negotiable instrument.

GPS device 116 may be located in an automobile (not shown), a mobile device (e.g., device 110), or other object.

In exemplary embodiments, host system 102 is in communication with a storage device 122, which is also included in the system of FIG. 1. Storage device 122 stores a variety of information including, e.g., information element records, ontological domains, notifications and agent messages (also referred to herein as "publications") as will be described further herein. Storage device 122 may be implemented using a variety of devices for storing electronic information. It will be understood that the storage device 122 may be implemented using memory contained in the host system 102 or may be a separate physical device. The storage device 122 is logically addressable as a consolidated data source across a distributed environment that includes network(s) 117. Information stored in the storage device 122 may be retrieved and manipulated via the host system 102.

The host system 102 depicted in FIG. 1 may be implemented using one or more servers operating in response to a computer program stored in a storage medium accessible by the server(s). The host system 102 may operate as a network server (e.g., a web server) to communicate with the information sources 104, 106, and 108, mobile communications device 110, user system 112, and GPS device 116. The host system 102 handles sending and receiving information to and from these devices and can perform associated tasks. The host system 102 may also include a firewall to prevent unauthorized access to the host system 102 and enforce any limitations on authorized access. For instance, an administrator may have access to the entire system and have the authority to modify portions of the system. A firewall may be implemented using conventional hardware and/or software as is known in the art.

The host system 102 may also operate as an application server. The host system 102 executes one or more computer programs to provide ontological domain and intelligent agent services. As shown in the system of FIG. 1, host system 102 is executing an ontological domain (OD) application 118 for implementing the ontological domain services, as well as an agent application 120 for implementing the intelligent agent services. Processing may be shared by other network entities (e.g., information sources 104-108, and/or devices 110, 112, 114, 116 and the host system 102 by providing an application (e.g., java applet) to these systems. Alternatively, these systems can include stand-alone software applications for performing a portion of the processing described herein. As previously described, it is understood that separate servers may be utilized to implement the network server functions and the application server functions.

Furthermore, the host system 102 may be integral with one of the devices 110, 112, 114, or 116. In this example, the OD application 118 and the agent application 120 would be embedded or enabled by one of those devices 110, 112, 114, or 116 without the need for a separate host system 102. A single device 110, 112, 114, or 116 would therefore be capable not only of detecting and communicating information but also of acting on that information through the OD application 118 and the agent application 120 which are resident on that device 110, 112, 114, or 116. As an example, consider an individual hiking on a mountain with a device 110. The device 110 may be able to detect the altitude, the GPS location of the individual, and receive weather information that warns of impending severe weather conditions. The device 110 may also have obtained information on a tent previously purchased by the individual and the purchase of a cabin rental. The OD application 118 detects a need for the individual to take protective action and the agent application 120 provides possible solutions, such as immediately going back down the mountain to the cabin or information on how and where to pitch the tent to be protected from the elements. In addition to having the host system 102, which includes the OD application 118 and agent application 120, resident on one of the devices 110, 112, 114, or 116, the host system 102 may reside on multiple of the devices 110, 112, 114, or 116 and/or the processing of the OD application 118 and the agent application 120 may be shared among devices 110, 112, 114, or 116.

The network(s) 117 may be any type of known networks including, but not limited to, a wide area network (WAN), a local area network (LAN), a global network (e.g. Internet), a virtual private network (VPN), an intranet, or a combination thereof. The network(s) 117 may be implemented using wireless network technologies or any kind of physical network implementation known in the art. Mobile communications device 110, user system 112, GPS device 116, and/or the host system 102 may be connected to the network(s) 117 in a wireless fashion.

Figure 2:
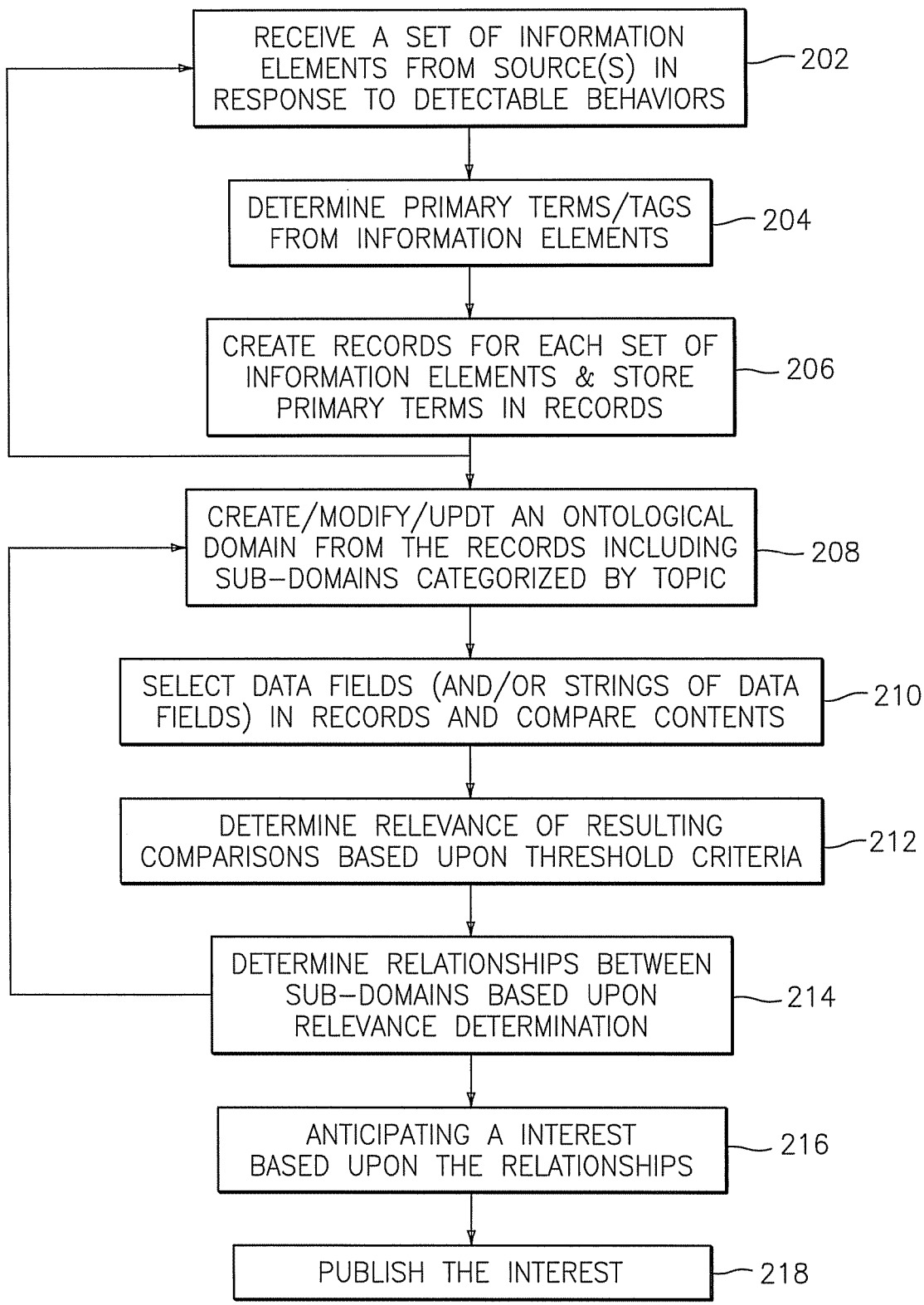
FIG. 2 is a flow diagram describing a process for implementing the ontological domain services in exemplary embodiments.

Turning now to FIG. 2, a process for implementing the ontological domain services will now be described in accordance with exemplary embodiments. The ontological domain services provide a mechanism for automating the collection of information that is derived from detectable behaviors. These behaviors may be conducted via any of devices 110, 112, 114, and 116 and/or via any of information sources 104, 106 and 108. At step 202, host system 102 receives information elements from a source. The information source of these elements may be one or more of mobile communications device 110, user system 112, GPS device 116, or any of information sources 104, 106, and 108. For example, the detectable behavior might be an individual accessing a website of a travel agency (e.g., merchant 104) via user system 112 and, using financial instrument 114 to purchase a reservation at a hotel. A set of information elements that may be produced by this behavior may include the name, address, and phone number of the individual ordering the reservation, the name of the hotel, the date of the reservation, the cost of the room, the method of payment (e.g., account number, card issuer, etc.), the name and identification (e.g., website address) of the travel agent, and other similar types of information elements. Much, if not all, of this information is easily captured during the purchase/order transaction.

A record of the transaction from which these information elements may be extracted is typically handled by the financial institution (e.g., 106) that processes the charge on behalf of the individual, the merchant (e.g., 104) via a reservation confirmation, and/or the individual via an electronic sales receipt transmitted, e.g., via email to the individual at the user system 112. Because much of this information may be confidential, the host system 102 providing the ontological domain services may establish a trusted relationship with specified sources of information in order to protect the identity of the individual and/or the privacy information contained in these information elements. The trusted relationship may include secure channels of communication (via e.g., encryption, virtual private networking technologies, and other tools for protecting confidential information).

In another example, the detectable behavior may be the presence of the individual in a geographic location. If the individual carries a cellular telephone (e.g., mobile communications device 110), the detectable behavior may include the presence of the individual in a specific location (e.g., cell) that is detected by a servicing cell tower, whereby the individual's cellular telephone communicates a signal to the cell tower, which in turn, notifies the host system 102 (either via the cellular telephone itself or directly). The set of information elements may include the identification of the location, the date, time and/or duration of the presence in the location, or other types of information.

A similar type of detectable behavior may be the location of the individual using GPS device 116. The detectable behavior may be acquired via the device 116, which sends a signal to a satellite, and which in turn, provides the location information to the host system 102 or directly to the device (e.g., automobile) that is carrying the GPS device 116. These information elements are collected by the ontological domain application 118 over a period of time (e.g., days, weeks, months, etc.).

In another example, a detectable behavior may be the presence of an individual at a particular function, e.g., a road race. The information elements may be derived from a combination of sources, such as a registration to participate in the event via a website and GPS information derived from the individual's presence at the event. The information elements produced from the website registration may include the nature of the function (e.g., road race), and the date and time of the event. The relationships between the registration information (e.g., date, time, and function), coupled with the GPS information (e.g., the location of the individual at the same date and time noted in the registration) provide a full picture of the behavior.

Returning now to FIG. 2, the ontological domain application 118 filters the set of information elements and selects primary terms and/or tags from these elements at step 204. This may be accomplished, for example, by eliminating commonly occurring words, such as "a", "the", "an", "or", etc. from the information set. The primary terms and/or tags may be captured and stored in a record using a standardized construct or data structure and corresponding data fields at step 206. A sample data structure 300 is shown in FIG. 3. The data fields include a RECORD_IDENTIFIER that may be used to uniquely identify a particular record which, in turn, stores a set of information elements. Each record may include multiple behaviors that may simultaneously occur at a given point in time. Other data fields provided in data structure 300 will be described in more detail in FIG. 4.

Turning now to FIG. 4, a database of records (including sample data) produced using the data structure 300 of FIG. 3 will now be described in accordance with exemplary embodiments. Database 400 of FIG. 4 includes multiple records that are identified in column 402A and stored in chronological order in the database 400. As shown in database 400, the records span a time period from Dec. 1, 2005 through Mar. 1, 2006 (column 402B). The time periods provided in column 402B reflect the date of the occurrence of the corresponding behavior. Likewise, the time column 402C indicates a time of the occurrence of the corresponding behavior. Each row in database 400 reflects a record. The data fields capturing the filtered information elements are shown as 402B-402I. Thus, for example, an individual frequented Anna's Market at 9:00 a.m. on Dec. 1, 2005. Anna's Market is located on Main Street. The individual purchased bread at the market for $5.00. The filtered information elements, or primary terms, from this activity are stored in the first Record of database 400.

As indicated above, multiple behaviors may be detected for a single activity or behavior. While only two columns are shown in database 400 (e.g., column 402F and 402G) to reflect a single behavior, it will be appreciated that additional columns may be provided in database 400 to reflect these multiple behaviors. It will also be appreciated that information elements may be acquired from a behavior that do not neatly fall into the specific columns or data fields provided in database 400. An OTHER column 402H provides flexibility in enabling additional descriptive information elements to be captured. For example, Record 2 illustrates that an individual purchased a Mercedes® automobile and within this purchase transaction, the current mileage of the vehicle is captured and stored in the record. Column 402I reflects a VALUE column that enables a value to be entered that corresponds to the nature of the behavior. For example, the cost of the vehicle in the second record is provided in the value column 402I, while the duration of a web search is provided in the value column 402I of Record 8 of database 400. Other values may be indicated in column 402I, e.g., cost savings.

Figure 5:
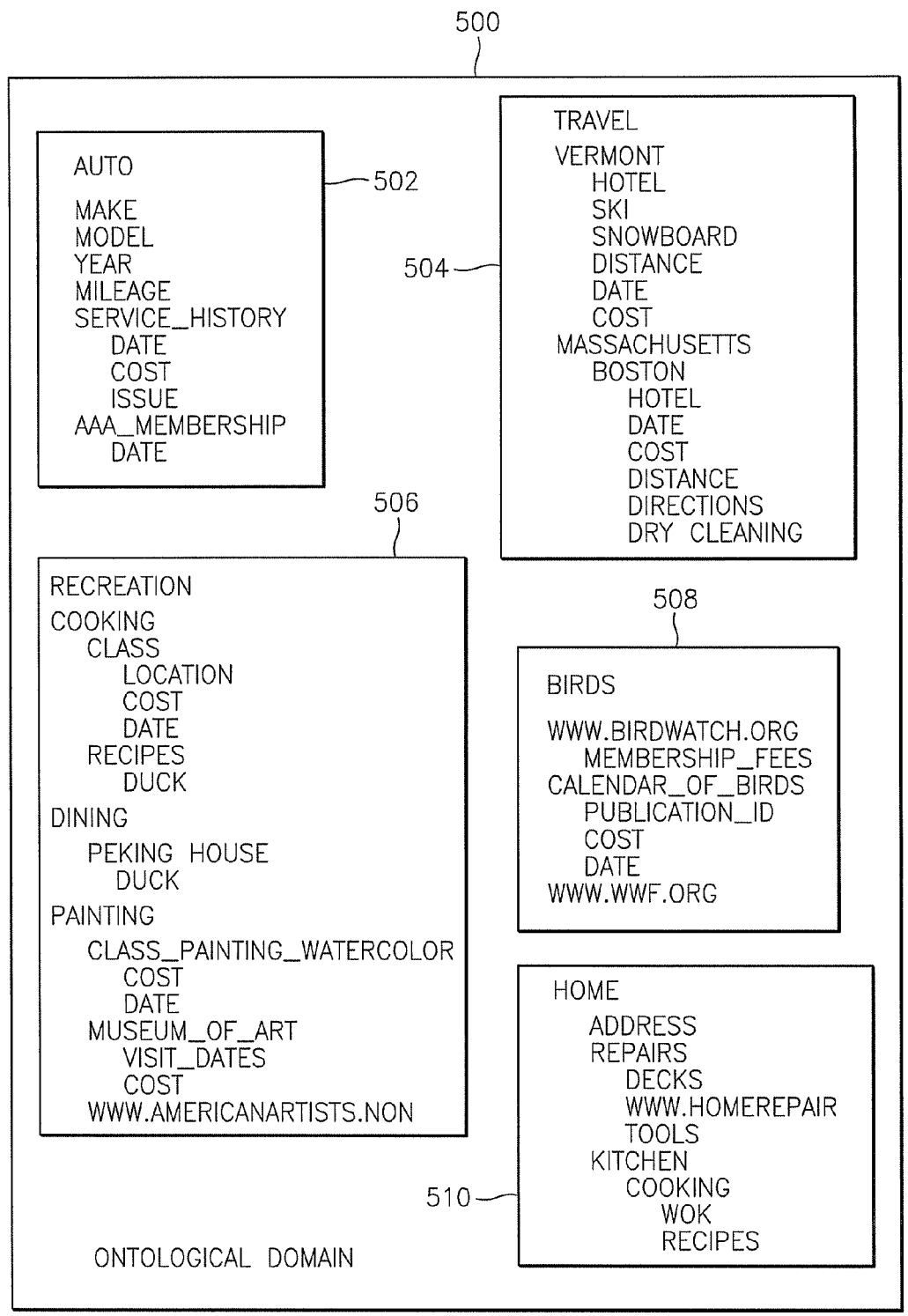
FIG. 5 is a record illustrating a sample ontological domain used in implementing the ontological domain services in exemplary embodiments.

Turning back to FIG. 2, the application 118 creates an ontological domain at step 208 using the records produced in step 206, a sample of which is shown in FIG. 5. The ontological domain application 118 linguistically assembles the collected information into sub-domains that are categorized using an arbitrarily formed and self-organized classification scheme. In other words, the ontological domain is not predefined by a "domain expert" but is dynamically created, defined, and refined over time based upon newly collected information and an analysis engine or component of the ontological domain application 118.

As shown in FIG. 5, the ontological domain includes sub-domains 502-510, namely, AUTO 502, TRAVEL 504, RECREATION 506, BIRDS 508, and HOME 510. Each sub-domain provides a contextually-organized collection of information elements using, e.g., a topical index produced from the behaviors. Each sub-domain, therefore, is customized according to the particular behaviors of an individual or actuator. For example, a shown in FIG. 5, sub-domain 510 includes a collection of home-related information elements that are grouped by topic (e.g., the individual's home). Note that the elements provided in sub-domain 510 reflect the behaviors produced and tracked, in part, in Records 4, 6, and 8-10 of database 400. Likewise, detectable behaviors used in collecting elements for sub-domain 502 may include, e.g., purchasing a car (Record 2), servicing the car, purchasing gasoline, and enrolling in an automobile servicing program.

Returning to FIG. 2, the ontological domain is analyzed by the ontological domain application 118. The analysis may be implemented using various combinations of search strings (e.g., concatenating two or more data fields 402B-402I) and searching the records for patterns, frequency, etc., that indicate one or more relationships among the elements. In addition, or alternatively, the analysis may include some pre-defined logic for assisting in the analysis. The analysis may include determining the relevance of each of the information elements based upon measurable aspects, e.g., quantity, frequency, costs, redundancy, history, relative location, time, duration, value, or a combination thereof at step 210. The relevance of these information elements may be determined by applying weights using these aspects in order to ascertain the significance of these behaviors at step 212. The analysis is useful in understanding the potential importance or significance of the information elements to the individual. These relevance determinations may change over time as new behaviors are detected and analyzed.

Potential relationships among elements between sub-domains are determined at step 214 and any relevance of these relationships. For example, using the ontological domain 500 of FIG. 5, suppose that sub-domain 502 reflects that the mileage on the individual's car is 20,000 as reflected by the service history (which also reflects that the last servicing was 3 months ago at the time of purchase). Suppose also, that the sub-domain 504 reflects that the individual booked a trip to a hotel in Vermont in March of 2006 (as shown in Record Y1 of database 400 of FIG. 4). Also suppose that the distance between the individual's residence and the hotel in Vermont is 200 miles. This distance may be acquired by acquiring the location of the individual's residence from sub-domain 510 and calculating the distance between the locations using, e.g., a mapping tool). The ontological domain application 118 analyzes the elements within these sub-domains in order to assess any relationships among them. The analysis results in a relationship between the sub-domains 502, 504, and 510 with respect to the automobile, the recreation, and the residence, respectively. The relationships determined among the sub-domain elements may result in a proposed or predicted interest for the individual at step 216; namely, the automobile may need to be serviced if a trip to Vermont is imminent. As shown in FIG. 2, this analysis is a looping process (step 214 returns to step 208) in order to account for newly acquired information.

At step 218, the ontological domain application 118 may publish the results of the analysis for the benefit of the individual. The individual may access the results in a number of ways. For example, the results may be formatted into a message format. A sample message 600 is shown and described in FIG. 6. The message 600, or notification, may be transmitted to the individual via network(s) 117, e.g., as an email, telephone communication, text message, or other means. The message 600 may be stored on any of devices 110, 112, or 116.

As indicated above, contextual intelligent agent services are also provided by the host system 102. The intelligent agent services are implemented via agent application 120 executing on the host system 102 and provide a mechanism for enabling automated intelligent agents to acquire and synthesize disparate types of information from a variety of information sources, and to present relevant and useful information to respective individuals, entities, and/or servicing agents that request these services. The intelligent agent services may be facilitated using information collected about an individual and/or by information directly provided by the individual. Alternatively, or in addition, the intelligent agent services may be facilitated using information acquired from one or more ontological domains (e.g., from the interest resulting from the process described in FIG. 2).

Figure 7:
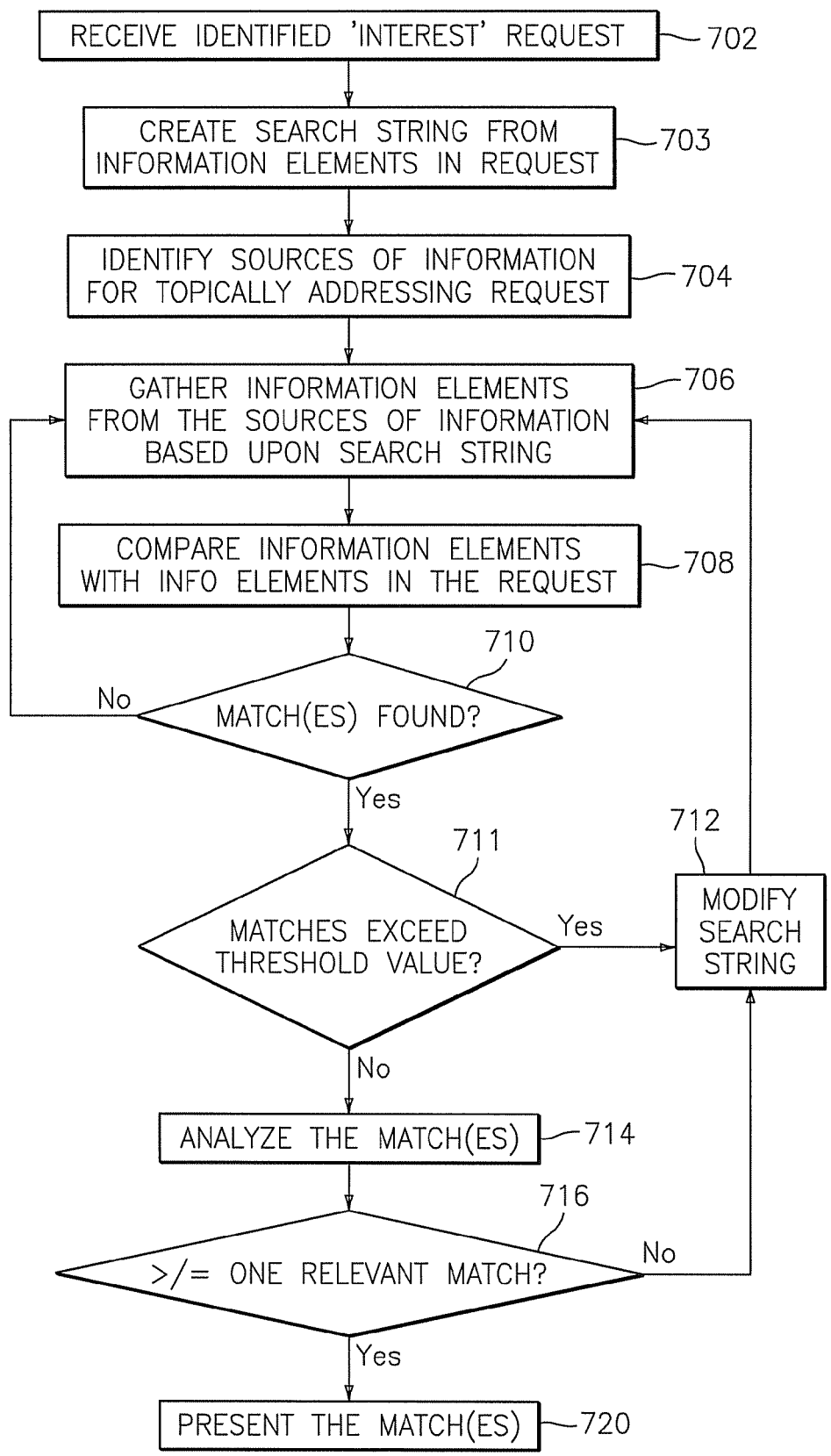
FIG. 7 is a flow diagram describing a process for implementing the intelligent agent services in exemplary embodiments.
Figure 8:
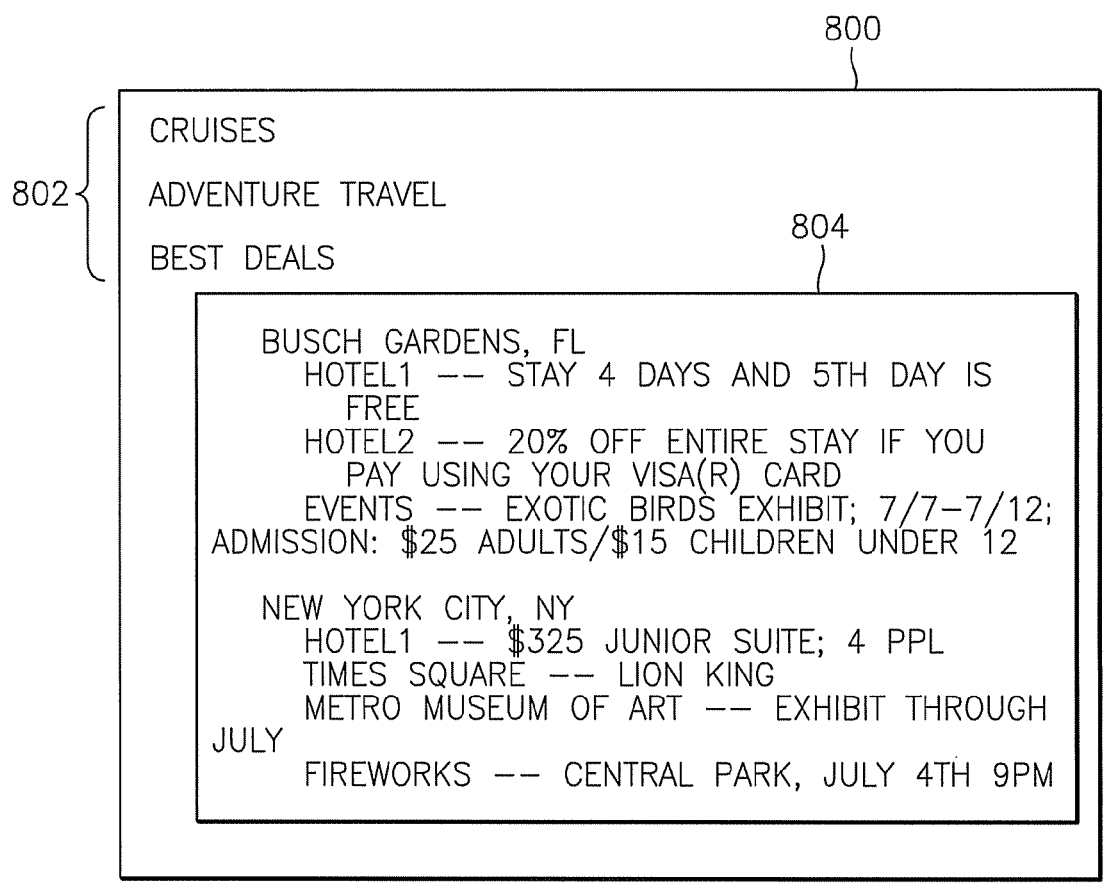
FIG. 8 is a sample notification that includes content resulting from the implementation of the intelligent agent services in exemplary embodiments.

Turning now to FIG. 7, a process for implementing the intelligent agent services will now be described in accordance with exemplary embodiments. At step 702, an interest is identified. As indicated above, the agent application 120 may receive this information, e.g., directly from an individual in the form of a request or it may be ascertained using, e.g., the results of the analysis performed on an ontological domain (e.g., domain 500). For example, suppose there is an interest in finding a vacation destination that is suitable for a family of four during the month of July.

The agent application 120 utilizes an agent that creates a search string at step 703 from the information elements and searches for information sources (e.g., information sources 104-108 of FIG. 1) that may potentially address the interest at step 704. This may be performed using various techniques, such as searching a database of information sources using key word search techniques (e.g., key words that reflect, identify, or describe the interest). A commercial search engine may be employed for identifying information sources as well. In addition, information sources may not be entirely electronic sources of information, but rather may be a combination of electronic, human, and/or mechanical sources of information. Using the above example, the search string used in the search may include [vacation+tourist attractions+July+family friendly+hotel+airline], etc. In addition, if the agent application 120 utilizes an ontological domain (e.g., domain 500) for the individual in this request, additional information elements may be inferred for this key word search, e.g., children's ages, residence of family from sub-domain 510 (e.g., in order to determine the nearest airport), interests (e.g., sub-domain 506 and 508 elements), etc.

Once one or more information sources are identified, the agent gathers information elements from these one or more sources via communications transmission technologies including, e.g., Rich Site Summary (RSS), File Transfer Protocol (FTP), BitTorrent, etc. at step 706. The information gathered may be formatted using a standardized data structure similar to the one shown and described in FIG. 3.

At step 708, the information elements gathered in step 706 are compared with information elements associated with the interest in order to identify any matches. At step 710, it is determined whether any matches have been found. If not, the process returns to step 706 where information continues to be gathered. Otherwise, the agent application 120 determines if the matches exceed a threshold at step 711. If so, the search string is modified at step 712 and the flow returns to step 706. The threshold is provided in order to ensure that only the most relevant information is returned (e.g., too many results may indicate that the search string is too broad and would not provide useful, relevant information).

If, however, the matches do not exceed the threshold at step 711, the intelligent agent application 120 analyzes the matches at step 714. The analysis may include determining the relevance of the information elements in a manner similar to that described in step 212 of FIG. 2 (e.g., by using the threshold criteria).

At step 716, the agent application 120 uses the results of the analysis to determine whether a solution exists for satisfying the interest (i.e., whether there is at least one relevant match). If not, the process returns to step 712 whereby a new search string (broadened) is generated for the agent. Otherwise, the match is formatted for publication at step 720. The solution, or match, may be represented as an agent message, or publication, a sample of which is shown and described in FIG. 8. Using the above example, the message may include a list of vacation destinations. As shown in a sample message 800 of FIG. 8, solutions are organized in a topical format, namely, CRUISES, ADVENTURE TRAVEL, and BEST DEALS 802. The user selects BEST DEALS, which causes a sub-window 804 to be presented. As shown in sub-window 804, the individual is presented with two options, "Busch Gardens, Fla." and New York City, N.Y.". The solution may include choices of hotels that provide a discount based upon the time of travel, the ages of the children, and the method of payment, to name a few. In addition, the solution for Busch Gardens reflects the interests of the individual (i.e., an event featuring an exhibit of exotic birds corresponding to sub-domain 508 of FIG. 5). The solution for New York City reflects the interests of the individual (i.e., Metropolitan Museum of Art exhibit in July corresponding to sub-domain 506 of FIG. 5).

In exemplary embodiments, the intelligent agent application 120 may initiate multiple agents for generating multiple searches, each of which relate to a specific interest. Thus, at any given time there may be many agents actively searching for information solutions to specified interests associated with a single individual.

In addition, exemplary embodiments may offer a service plan that enables individuals to request development and maintenance of personalized ontological domains, e.g., for a servicing fee. The ontological domain services may provide services based upon time (e.g., per month), number of interests per individual, or other criteria. Furthermore, the same or independent service provider may provide intelligent agent services to individuals using similar service plan criteria (e.g., per month, number of interests), or may be structured around a number of agents employed.

As indicated above, the ontological domain and intelligent agent services provide an automated, self-governing tool for collecting and processing information elements as a result of detectable behaviors, and anticipating an interest as a result. The intelligent agent services also facilitate the search and acquisition of relevant information in anticipation of an interest, or in response to a request for a solution for an interest.

As described above, the exemplary embodiments can be embodied in the form of computer-implemented processes and apparatuses for practicing those processes. The exemplary embodiments can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the embodiments. The exemplary embodiments can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing intelligent agent services, comprising:
    generating an ontological domain for an individual based upon information elements, wherein a set of information elements represents a behavior of the individual at a point in time, the generating including creating subdomains of contextually organized collections of a plurality of sets of the information elements, the subdomains including any orthogonally related data identified among a plurality of behaviors;
    determining relevance of relationships among the plurality of sets of the information elements in the ontological domain, the relevance determined based upon measurable aspects, wherein a relationship determined to be relevant is identified as an interest of the individual;
    identifying sources of information topically related to the interest;
    searching the sources of information using the plurality of sets of the information elements having the relationship determined to be relevant to identify a solution for satisfying the interest; and
    detecting the behavior of the individual, gathering the information elements from a portion of the sources in response to the detecting;
    wherein detectable behaviors represent behavioral indicators that occur within a physical and virtual geography and in relation to time, the detectable behaviors including a transaction, a presence of the individual at a location, a presence of the individual at a function, and a computer query;
    wherein the presence of the individual at a function is determined by analyzing a combination of activities conducted by the individual at the sources.

2. The method of claim 1, further comprising:
    formatting the solution into a message; and
    presenting the message to a device associated with the individual.

3. The method of claim 1, wherein searching the sources of information further comprises:
    creating a search string from at least a portion of the plurality of sets of the information elements;
    gathering data in response to searching the sources of information using the search string, and comparing the data to the plurality of sets of the information elements;
    identifying matches between the data and the plurality of sets of the information elements; and
    analyzing the matches to determine the solution.

4. The method of claim 1, further comprising:
    dynamically updating the ontological domain over time by iteratively gathering the information elements from sources in response to detecting behaviors of the individual, and updating the subdomains to reflect the iterative gathering; and
    updating the interest based upon updates made to the ontological domain.

5. The method of claim 1, further comprising:
    storing each of the plurality of sets of information elements in a corresponding record using a standard data structure having corresponding data fields, the record including a unique identifier; and
    storing records produced for each of the plurality of sets of the information elements in a database;
    wherein creating subdomains that include orthogonally related data includes identifying matching information elements from data fields across multiple records in the database via corresponding unique identifiers.

6. The method of claim 1, wherein the
    presence of the individual at the location is determined by cellular network and device;
    wherein the information elements include:
    the physical location;
    name of the individual;
    time of presence of the individual at the physical location; and
    nature of activity conducted at the physical location.

7. A system for implementing intelligent agent services, comprising:
    a host system computer; and
    an application executing on the host system computer, the application implementing:
    generating an ontological domain for an individual based upon information elements, wherein a set of information elements represents a behavior of the individual at a point in time, the generating including creating subdomains of contextually organized collections of a plurality of sets of the information elements, the subdomains including any orthogonally related data identified among a plurality of behaviors;
    determining relevance of relationships among the plurality of sets of the information elements in the ontological domain, the relevance determined based upon measurable aspects, wherein a relationship determined to be relevant is identified as an interest of the individual;
    identifying sources of information topically related to the interest;
    searching the sources of information using the plurality of sets of the information elements having the relationship determined to be relevant to identify a solution for satisfying the interest; and
    detecting the behavior of the individual, gathering the information elements from a portion of the sources in response to the detecting;
    wherein detectable behaviors represent behavioral indicators that occur within a physical and virtual geography and in relation to time, the detectable behaviors including a transaction, a presence of the individual at a location, a presence of the individual at a function, and a computer query;

wherein the presence of the individual at a function is determined by analyzing a combination of activities conducted by the individual at the sources.

8. The system of claim 7, wherein the application further implements:

formatting the solution into a message; and presenting the message to a device associated with the individual.

9. The system of claim 7, wherein searching the sources of information further comprises:

creating a search string from at least a portion of the plurality of sets of the information elements;

gathering data in response to searching the sources of information using the search string, and comparing the data to the plurality of sets of the information elements;

identifying matches between the data and the information elements; and analyzing the matches to determine the solution.

10. The system of claim 7, wherein the application further implements:

dynamically updating the ontological domain over time by iteratively gathering the information elements from sources in response to detecting behaviors of the individual, and updating the subdomains to reflect the iterative gathering; and updating the interest based upon updates made to the ontological domain.

11. The system of claim 7, wherein the application further implements:

storing each of the plurality of sets of the information elements in a corresponding record using a standard data structure having corresponding data fields, the record including a unique identifier; and storing records produced for each of the plurality of sets of the information elements in a database;

wherein creating subdomains that include orthogonally related data includes identifying matching information elements from data fields across multiple records in the database via corresponding unique identifiers.

12. A computer-readable storage medium for implementing intelligent agent services, the computer-readable storage medium including instructions embodied on a computer readable medium for implementing a method, the method comprising:

generating an ontological domain for an individual based upon information elements, wherein a set of information elements represents a behavior of the individual at a point in time, the generating including creating subdomains of contextually organized collections of a plurality of sets of the information elements, the subdomains including any orthogonally related data identified among a plurality of behaviors;

determining relevance of relationships among the plurality of sets of the information elements in the ontological domain, the relevance determined based upon measurable aspects, wherein a relationship determined to be relevant is identified as an interest of the individual;

identifying sources of information topically related to the interest;

searching the sources of information using the plurality of sets of the information elements having the relationship determined to be relevant to identify a solution for satisfying the interest;

detecting the behavior of the individual, gathering the information elements from a portion of the sources in response to the detecting; and wherein detectable behaviors represent behavioral indicators that occur within a physical and virtual geography and in relation to time, the detectable behaviors including a transaction, a presence of the individual at a location, a presence of the individual at a function, and a computer query;

wherein the presence of the individual at a function is determined by analyzing a combination of activities conducted by the individual at the sources.

13. The computer-readable storage medium of claim 12, further comprising instructions for implementing:

formatting the solution into a message; and presenting the message to a device associated with the individual.

14. The computer-readable storage medium of claim 12, wherein searching the sources of information further comprises:

creating a search string from at least a portion of the plurality of sets of the information elements;

gathering data in response to searching the sources of information using the search string, and comparing the data to the plurality of sets of the information elements;

identifying matches between the data and the plurality of sets of the information elements; and analyzing the matches to determine the solution.

15. The computer-readable storage medium of claim 12, further comprising instructions for implementing:

dynamically updating the ontological domain over time by iteratively gathering the information elements from sources in response to detecting behaviors of the individual, and updating the subdomains to reflect the iterative gathering; and updating the interest based upon updates made to the ontological domain.

16. The computer-readable storage medium of claim 12, further comprising instructions for implementing:

storing each of the plurality of sets of information elements in a corresponding record using a standard data structure having corresponding data fields, the record including a unique identifier; and storing records produced for each of the plurality of sets of the information elements in a database;

wherein creating subdomains that include orthogonally related data includes identifying matching information elements from data fields across multiple records in the database via corresponding unique identifiers.

17. The computer-readable storage medium of claim 12, wherein the behavior includes:

a presence of the individual at a physical location, the presence of the individual at the location is determined by a global positioning system network and device;

wherein the information elements include:

the physical location;

name of the individual;

time of presence of the individual at the physical location; and nature of activity conducted at the physical location.

* * * * *